US012626914B2

(12) United States Patent
Locke et al.

(10) Patent No.: US 12,626,914 B2
(45) Date of Patent: May 12, 2026

(54) ANODE PROTECTION LAYER

(71) Applicant: GELION TECHNOLOGIES PTY LTD, Eveleigh (AU)

(72) Inventors: Jacob Locke, Abingdon (GB); Jokin Ricarte, Abingdon (GB); Marco Carboni, Abingdon (GB); Rachel Lear, Abingdon (GB); Ulderico Ulissi, Abingdon (GB)

(73) Assignee: Gelion Technologies Pty Ltd, Eveleigh (AU)

( * ) Notice: Subject to any disclaimer, the term of this patent is extended or adjusted under 35 U.S.C. 154(b) by 755 days.

(21) Appl. No.: 17/597,401

(22) PCT Filed: Jul. 9, 2020

(86) PCT No.: PCT/GB2020/051659
§ 371 (c)(1),
(2) Date: Jan. 5, 2022

(87) PCT Pub. No.: WO2021/005376
PCT Pub. Date: Jan. 14, 2021

(65) Prior Publication Data
US 2022/0278318 A1 Sep. 1, 2022

(30) Foreign Application Priority Data
Jul. 10, 2019 (GB) ..................................... 1909927

(51) Int. Cl.
*H01M 4/40* (2006.01)
*H01M 4/04* (2006.01)
(Continued)

(52) U.S. Cl.
CPC ......... *H01M 4/405* (2013.01); *H01M 4/0404* (2013.01); *H01M 4/366* (2013.01);
(Continued)

(58) Field of Classification Search
CPC ...... H01M 4/04; H01M 4/0404; H01M 4/405; H01M 4/366; H01M 4/661
See application file for complete search history.

(56) References Cited

U.S. PATENT DOCUMENTS 6,025,094 A 2/2000 Visco et al.
6,303,248 B1 * 10/2001 Peterson ............... H01M 50/59
429/177

(Continued)

FOREIGN PATENT DOCUMENTS

EP 3413380 A1 12/2018
JP 2003-515892 A 5/2003
(Continued)

*Primary Examiner* — Kenneth J Douyette
(74) *Attorney, Agent, or Firm* — BakerHostetler

(57) ABSTRACT

An electrochemical cell assembly comprising: at least one electrochemical cell or cells comprising—a cathode comprising an electrochemically active material; —an anode comprising an alkali metal or alkali metal alloy layer and a protection layer containing a first layer and a second layer; wherein the first layer comprises a metal and/or non-metal that alloys with an alkali metal and is formed on the alkali metal or alkali metal alloy layer, and an second layer deposited on the first layer, wherein the second layer is an ionically conducting layer having an electronic conductivity of less than $10^{-5}$ S cm$^{-1}$; and—an electrolyte, and wherein the cell assembly further comprises a means of applying pressure to the at least one electrochemical cell or cells.

19 Claims, 7 Drawing Sheets

(51) Int. Cl.

| | | |
|---|---|---|
| *H01M 4/36* | (2006.01) | |
| *H01M 4/66* | (2006.01) | |
| *H01M 10/04* | (2006.01) | |
| *H01M 10/0525* | (2010.01) | |
| *H01M 10/39* | (2006.01) | |
| H01M 4/02 | (2006.01) | |

(52) U.S. Cl.
   CPC ....... *H01M 4/661* (2013.01); *H01M 10/0468* (2013.01); *H01M 10/0525* (2013.01); *H01M 10/3909* (2013.01); *H01M 2004/027* (2013.01); *H01M 2300/0068* (2013.01)

(56) References Cited

U.S. PATENT DOCUMENTS

| | | | |
|---|---|---|---|
| 6,537,701 B1 | 3/2003 | Nimon | |
| 6,733,924 B1 | 5/2004 | Skotheim et al. | |
| 2011/0177377 A1 | 7/2011 | Dube | |
| 2013/0280605 A1* | 10/2013 | Affinito ................. | H01M 4/382 429/211 |
| 2014/0178766 A1* | 6/2014 | Kato ..................... | H01M 4/667 361/502 |
| 2018/0342761 A1* | 11/2018 | Eaglesham ....... | H01M 10/0459 |

FOREIGN PATENT DOCUMENTS

| | | |
|---|---|---|
| KR | 10-1807911 B1 | 12/2017 |
| WO | 01/39302 A1 | 5/2001 |
| WO | 2012/174393 A1 | 12/2012 |

* cited by examiner

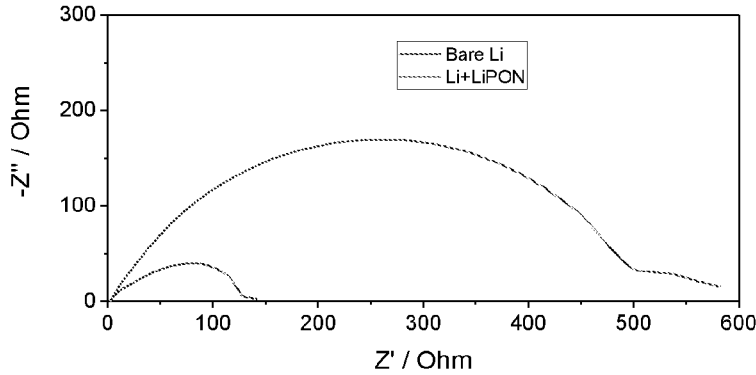
FIGURE 3a
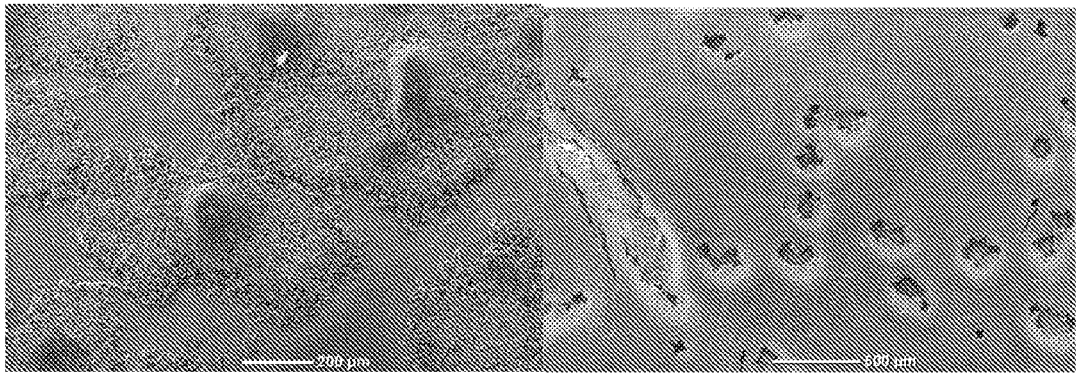
FIGURE 3b
FIGURE 3

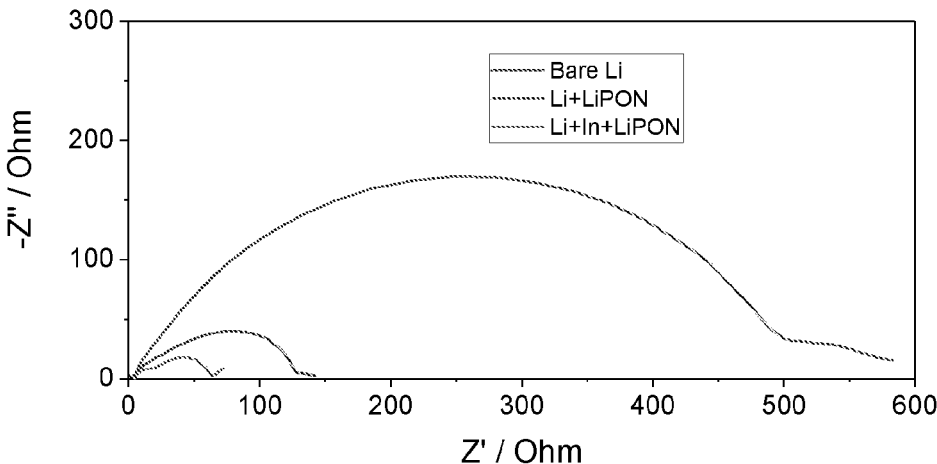
Figure 6a
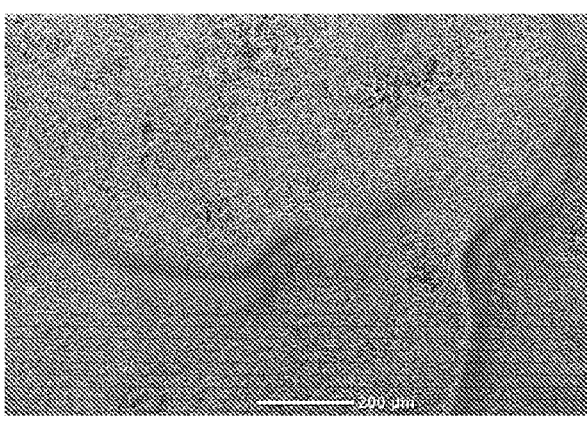
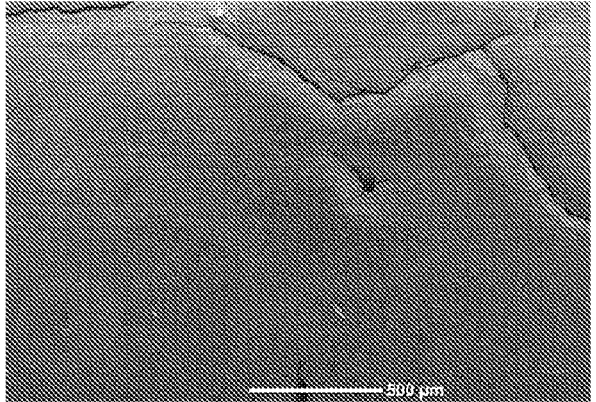
Figure 6b
FIGURE 6

ANODE PROTECTION LAYER

The present invention relates to an electrochemical cell. The present invention also relates to a method of forming an electrochemical cell, in particular a method of forming a coating on an anode of an electrochemical cell.

BACKGROUND

Electrodes comprising alkali and alkaline earth metals have been used in both primary and secondary electrochemical cells. In particular, lithium has been found to be a desirable material for the formation of electrodes, as it is a lightweight material that can provide a high energy density. This can enable construction of cells that are suitable for a wide range of applications, including those where minimising the weight of the cell is of great importance. In a lithium-sulphur cell, for instance, lithium metal foil may be used as the anode of the cell.

However, despite the advantages provided by the use of such electrodes, alkali and alkaline earth metals have certain disadvantages when employed in electrochemical cells. Using lithium metal foil as an example, lithium may react with the electrolyte within a cell. This may form a resistive layer over the electrode and decrease battery performance over time. Lithium dendrites and/or mossy deposits may also be formed on the surface of the lithium metal foil during cycling, which can result in short-circuiting and decreased cycling performance, and may ultimately lead to reduction of the lifetime of the cell.

In view of the above difficulties, the inclusion of a protective layer on the surface of an anode may be desirable. Various protective layers have been proposed. Such a protective layer is required to conduct alkali metal ions, whilst reducing or preventing contact between the surface of the anode and the bulk electrolyte. For example, an alloy layer on top of the anode has been suggested as a means of improving the cycling or capacity characteristics of a cell. However, alkali metal alloy layers may react with the electrolyte over time, resulting in the formation of a resistive layer on top of the electrode. Alkali metal plating on top of the alloy layer may also be observed, along with uneven stripping.

Ceramic materials have also been proposed as a candidate for forming a protection layer on an anode. U.S. Pat. No. 6,025,094 discloses a negative electrode having an alkali metal layer and a glassy or amorphous protective layer coating the alkali metal layer, wherein the protective layer conducts alkali metal ions. However, the use of a ceramic layer may increase charge transfer resistance of an anode, which may result in inhomogeneous stripping and plating of the alkali metal and alkali metal deposition on the top of the protective layer.

BRIEF DESCRIPTION OF DRAWINGS

FIG. 3 provides SEM images and impedance graphs of a lithium anode having a ceramic layer formed on the surface.

FIG. 6 provides digital photographs and SEM images of a protected lithium anode in accordance with an embodiment of the present invention.

DESCRIPTION

Figure 1:
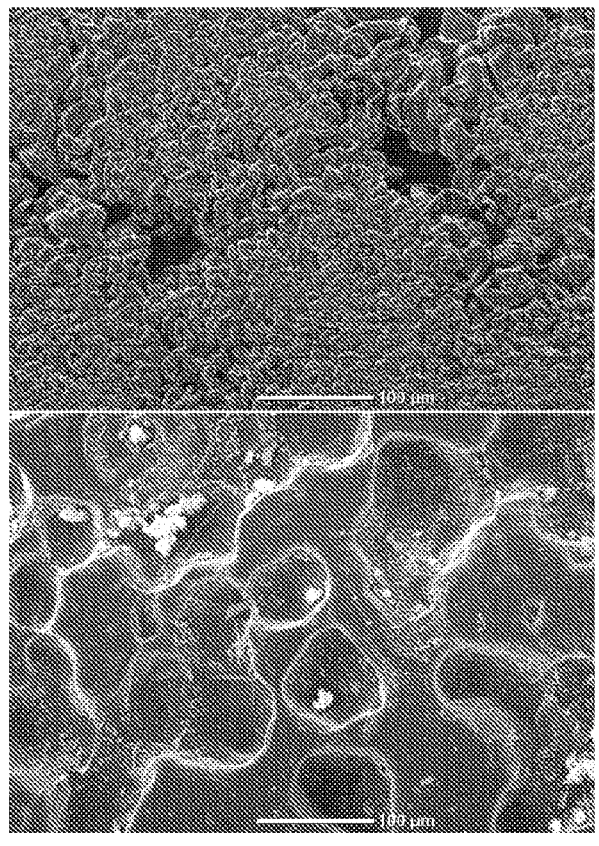
FIG. 1 provides SEM images of the surface of a lithium metal electrode.

Before particular examples of the present invention are described, it is to be understood that the present disclosure is not limited to the particular cell, method or material disclosed herein. It is also to be understood that the terminology used herein is used for describing particular examples only and is not intended to be limiting, as the scope of protection will be defined by the claims and equivalents thereof.

In describing and claiming the cell and method of the present invention, the following terminology will be used: the singular forms "a", "an", and "the" include plural forms unless the context clearly dictates otherwise. Thus, for example, reference to "an anode" includes reference to one or more of such elements.

In accordance with a first aspect of the present invention, there is provided an electrochemical cell assembly comprising:

at least one electrochemical cell or cells comprising
    a cathode comprising an electrochemically active material;
    an anode comprising an alkali metal or alkali metal alloy layer and a protection layer containing a first layer and a second layer; wherein the first layer comprises a metal and/or non-metal that alloys with an alkali metal and is formed on the alkali metal or alkali metal alloy layer, and wherein the second layer is deposited on the first layer and comprises an ionically conducting layer having an electronic conductivity of less than $10^{-5}$ S cm$^{-1}$; and
    an electrolyte, and
wherein the cell assembly further comprises a means of applying pressure to the at least one electrochemical cell or cells.

In accordance with another aspect of the present invention, there is provided an electrochemical cell assembly comprising:

at least one electrochemical cell or cells comprising
    a cathode comprising an electrochemically active material;
    an anode comprising an alkali metal or alkali metal alloy layer and a protection layer containing a first layer and a second layer; wherein the first layer comprises a metal and/or non-metal that alloys with an alkali metal and is formed on the alkali metal or alkali metal alloy layer, and wherein the second layer is deposited on the first layer and comprises an ionically conducting layer comprising at least one of a conducting polymer, a ceramic or glass material, a polymer and ceramic composite material; and
    an electrolyte, and
wherein the cell assembly further comprises a means of applying pressure to the at least one electrochemical cell or cells.

In accordance with another aspect of the present invention, there is provided a method of forming an electrochemical cell assembly as described above, said method comprising:

a) providing an alkali metal or alkali metal alloy layer;

b) contacting at least one metal and/or non-metal that forms an alloy with an alkali metal with the alkali metal or alkali metal alloy layer to form a continuous first layer;

c) depositing an ionically conducting layer having an electronic conductivity of less than $10^{-5}$ S cm$^{-1}$ on the surface of the first layer to form a continuous second layer; wherein steps a) to c) form an anode;

d) providing an electrolyte;

e) providing a cathode; wherein steps a) to e) form an electrochemical cell;

f) applying a means to provide a force to at least one cell in accordance with steps a) to e).

As used throughout the specification, the term "anode" refers to the negative electrode in an electrochemical cell, i.e. the electrode at which oxidation occurs during charge of the cell. As used throughout the specification, the term "cathode" refers to the positive electrode in an electrochemical cell, i.e. the electrode at which reduction occurs during charge of the cell.

The protection layer in accordance with the present invention can include two sub-layers. Preferably, the protection layer comprises a first and second layer, wherein the second layer is in direct contact with the electrolyte of the cell. Cells may also be envisaged in which the protection layer comprises more than two layers. For example, the protection layer may comprise two or more layers which can alloy with an alkali metal. Additionally or alternatively, the protection layer may comprise two or more ionically conductive layers. Other suitable layers may also be included within the protection layer. Preferably, the protection layer comprises a metal and/or non-metal that alloys with an alkali metal and is formed on an alkali metal or alkali metal alloy layer, and a second layer that is deposited on the first layer and comprises an ionically conducting layer having an electronic conductivity of less than $10^{-5}$ S cm$^{-1}$.

In forming a protection layer that comprises a first and second layer as described herein, the present inventors have provided an anode coating that may have beneficial effects on cell performance. Such a protection layer may have improved properties, for example reduced interfacial resistance, in comparison with a cell that comprises a number of different coatings on the anode. In combination, the first and second layer may have a thickness of between 2 nm and 10000 nm, preferably between 10 nm and 4000 nm, more preferably between 100 nm and 5000 nm, for example between 500 nm and 3000 nm. Maintaining a relatively small thickness of the individual layers, and a relatively small thickness of the combination of layers, may reduce or eliminate the tendency of the protective layer to crack. Avoiding or minimising cracking may be beneficial in terms of the lifetime of a cell.

The protection layer or coating in accordance with the present invention may provide an improved battery performance. For example, the electrochemical cell in accordance with the present invention may provide improvements in cycling and capacity life. Without wishing to be bound by any theory, it is believed that the protection layer allows homogeneous stripping, during discharge, of alkali metal (for example, lithium or sodium) from an anode comprising such a metal. Inhomogeneous stripping may have the result of pitting and/or cracking of the electrode, which can reduce the lifetime and/or performance of the cell. Inhomogeneous stripping and plating may also result in the formation of alkali metal dendrites, which may cause safety issues and the risk of short circuits, and may lower the energy density of a cell. FIG. 1 illustrates uneven plating and stripping on the surface of a lithium metal electrode. Areas of high surface area lithium formation may occur during deposition, along with pitting of the electrode during stripping. In FIG. 1, pitting of the surface can be seen.

While a protection layer that allows the formation of an alloy with an alkali metal such as lithium or sodium may provide benefits such as a reduction in charge transfer resistance when the protection layer is applied, such an alloying layer may react with the electrolyte over time, resulting in an increase in resistance and electrolyte depletion. Significant alkali metal plating may also occur on top of the alloying layer, alongside the formation of cracking and/or pitting on the surface. The use of a ceramic protection layer alone may also increase charge transfer resistance, while also resulting in inhomogeneous alkali metal stripping and/or plating. Thus, either an alloying protection layer alone, or a ceramic protection layer alone, may not be an appropriate means of providing an improved anode structure. The present inventors have surprisingly found that a protection layer having a first and a second layer as defined herein may result in homogeneous stripping from the alkali metal layer. The present inventors have also found that, during charge, alkali metal deposition may occur underneath the alloying layer. Without wishing to be bound by any theory, this may be a consequence of reduced interfacial resistance in comparison to other protective systems. This could potentially be attributed to the interface between the first and second layer being very dense, meaning that alkali metal nucleation preferentially occurs between the current collecting layer and the alloying layer. The deposition of alkali metal such as lithium underneath the alloying layer may beneficially provide a more even deposition and provide a smooth anode surface. The formation of cracks and voids in the anode surface may be minimized or prevented. The present inventors have also found reduced impedance of an anode in accordance with the invention when compared with a comparable, unprotected anode. The inventors have also found a reduced impedance in comparison with an anode having either an alloying protection layer alone, or a ceramic protection layer alone. Without wishing to be bound by any theory, it is believed that this reduced impedance may enable deposition/stripping to occur under the protection layer.

The electrochemical cell in accordance with the present invention may be any suitable alkali metal or alkaline earth metal-based cell. The anode described herein may be coupled with various positive electrode materials, and may in particular be coupled to any high energy cathode. Non-limiting examples of electrochemical cells include a lithium or sodium sulphur cell, lithium or sodium ion cell (for example a lithium or sodium NMC cell), or a lithium or sodium air cell (for example, a lithium or sodium O$_2$ cell). Preferably, the electrochemical cell is a lithium sulphur or lithium ion cell. Alternatively, the cell may comprise an alkaline earth metal such as magnesium instead of lithium or sodium. Each electrochemical cell may comprise an anode and a cathode, and an electrolyte present between the anode and the cathode.

The electrochemical cell in accordance with the present invention comprises an alkali metal or alkali metal alloy layer. The alkali metal or alkali metal alloy layer forms part of the anode. Any suitable alkali or alkaline earth metal or metal alloy may be coated with the protective coating described herein. For example, the alkali metal may be lithium metal or lithium metal alloy. Preferably, the anode comprises a foil formed of lithium metal or lithium metal alloy. Examples of lithium alloy include lithium aluminium alloy, lithium magnesium alloy and lithium boron alloy. Preferably, a lithium metal foil is used. Alternatively, the anode may comprise a sodium metal or sodium metal alloy, or a magnesium metal or magnesium metal alloy. The alkali or alkaline earth metal or metal alloy layer may have a thickness of between 500 nm to 200 μm, preferably between 1 μm and 100 μm, for example between 25 μm and 75 μm.

The anode may further comprise an optional current collector. A separate current collector may be combined with an alkali metal or alkaline earth metal layer to form a current collecting layer, in which the alkali metal or metal alloy layer is in electrical contact with the current collector. Where present, the separate current collector may comprise an electrically conductive metallic material, for example a metallic foil, sheet or mesh. A current collector in a lithium or sodium cell may typically be composed of a metallic conductor other than the first metal, for example other than lithium or sodium. Preferably, the metal chosen is substantially inert so that the current collector does not affect the cell chemistry. Examples of suitable metals include aluminium, copper or nickel. In a preferred example, the current collector comprises copper foil. The alkali metal may be formed or disposed on the current collector to form a current collecting layer. Alternatively, a separate current collector may be absent from the anode structure.

The protection layer comprises a first layer on the alkali metal or alkali metal alloy layer. Preferably, the first layer is a continuous layer, i.e. covers the whole surface of the alkali metal or alkali metal alloy layer. The first layer is in intimate contact with the alkali metal or alkali metal alloy layer. The first layer comprises at least one metal and/or non-metal that can form an alloy with an alkali metal such as lithium or sodium. The term "alloy" refers to a combination of two or more metals, or a combination of one or more metals with other, non-metallic elements. Examples of suitable alloying metals and non-metals include aluminium, gallium, boron, indium, zinc, carbon, silicon, germanium, tin, lead, antimony, silver, gold, sodium, potassium, magnesium, calcium, and mixtures thereof. Examples of base lithium alloys that may be included in the alloy layer in a lithium-based cell include $Li_nAl_x$, $Li_nZn_x$, $Li_nGa_x$, $Li_nIn_x$, $Li_nC_x$, $Li_nC_x$, $Li_nSi_x$, $Li_nGe_x$, $Li_nSn_x$, $Li_nPb_x$, $Li_nSb_x$, $Li_nAg_x$, $Li_nAu_x$, $Li_nNa_x$, $Li_nK_x$, $Li_nMg_x$, $Li_nCa_x$, wherein n may be between 0.1 and 20, for example between 1 and 5, and x may be between 0.5 and 10, for example between 1 and 5. For example, lithium-indium alloys that may be formed in the first layer may include $Li_{0.3}In_{1.7}$, $LiIn$, $Li_5In_4$, $Li_3In_2$, $Li_2In$ and $Li_{13}In_3$, but further alloys may additionally/alternatively be formed. One or more base metal alloys may be included in the alloying layer. In a preferred embodiment, the alloying layer comprises a lithium-indium alloy. Alternatively, the alloying layer comprises a lithium-zinc alloy. The alloying layer may comprise a sodium-indium or a sodium-zinc alloy. Alloying of the alloying metal and/or non-metal with alkali metal may occur during cycling of the cell. Alternatively, some alloying may occur during manufacture of the cell.

The first layer is electronically conductive. The first layer may have an electronic conductivity of greater than $10^{-5}$ S cm$^{-1}$, preferably greater than $10^{-3}$ S cm$^{-1}$, more preferably greater than $10^{-1}$ S cm$^{-1}$, for example greater than 1 S cm$^{-1}$. The electronic conductivity of the first layer may enable alloying reactions to occur between the alkali metal or metal alloy layer and the first layer. The electronic conductivity may also enable alloying reactions to occur between the first layer and alkali metal ions present in the cell, for example in the electrolyte. The electronic conductivity may be measured by any suitable method.

The first layer may have a high alkali metal diffusivity, i.e. allowing the passage of alkali metal ions through the layer. The first layer may have an initial alkali metal diffusivity of greater than $10^{-15}$ cm$^2$ s$^{-1}$, preferably greater than $10^{-10}$ cm$^2$ s$^{-1}$, more preferably greater than $10^{-8}$ cm$^2$ s$^{-1}$, for example greater than $10^{-7}$ cm$^2$ s$^{-1}$. The first layer may have a high alkali metal diffusivity in its pristine form, i.e. prior to cycling. Alternatively, the first layer may have a lower alkali metal diffusivity prior to cycling, for example an alkali metal diffusivity lower than $10^{-15}$ cm$^2$ s$^{-1}$. During cycling, the alkali metal content within the first layer will vary due to, for example, the point of charge or discharge. Thus, the alkali metal diffusivity may increase when alkali metal contained in the first layer is stripped during cycling. A high diffusivity of the "intermediate" species that form the first layer may allow spontaneous and homogeneous stripping from the alkali metal in the current collecting layer.

The first layer is ionically conducting, i.e. allows the passage of alkali metal ions through the layer. Accordingly, during cell discharge, alkali metal ions can flow through the coating into the electrolyte. Similarly, when the cell is charged, alkali metal ions from the electrolyte can diffuse and migrate through the coating and deposit beneath the coating as alkali metal, for example lithium or sodium. The first layer may have an ionic conductivity of greater than $10^{-9}$ S cm$^{-1}$, preferably greater than $10^{-8}$ S cm$^{-1}$, preferably greater than $10^{-7}$ S cm$^{-1}$, more preferably greater than $10^{-6}$ S cm$^{-1}$, for example greater than $10^{-5}$ S cm$^{-1}$. The ionic conductivity may be measured by any suitable method.

The first layer may have a high ionic conductive and/or a high alkali metal diffusivity. In one embodiment, the first layer may have an ionic conductivity of greater than $10^{-9}$ S cm$^{-1}$ and an alkali metal diffusivity of greater than $10^{-15}$ cm$^2$ s$^{-1}$.

The first layer is able to store a certain amount of alkali metal. The amount of alkali metal stored within the first layer varies at different stages in cycling of a cell. The total amount of alkali metal able to be stored within the first layer may be less than 60% of the electrochemical alkali metal storage capacity of the electroactive material within the cathode, preferably less than 30%, preferably less than 10%, for example less than 5%. During charge of the electrochemical cell, the first layer may become saturated with alkali metal. As charging proceeds towards completion, formation (nucleation and growth) of elemental alkali metal beneath the alloying layer may occur.

The thickness of the first layer may be between 1 nm and 5000 nm, preferably between 10 nm and 1000 nm, for example between 100 nm and 500 nm.

The protection layer further comprises a second layer deposited on the first layer. The second layer is in intimate contact with the first layer. Preferably, the second layer is a continuous layer, i.e. covers the whole surface of the first layer. The second layer may have a uniform thickness. The thickness of the second layer may be between 1 nm and 1000 nm, preferably between 10 nm and 500 nm, for example between 100 nm and 250 nm.

The second layer is ionically conducting, i.e. allows the passage of alkali metal ions through the layer. Accordingly, during cell discharge, alkali metal ions can flow through the coating into the electrolyte. Similarly, when the cell is charged, alkali metal ions from the electrolyte can migrate through the coating and deposit beneath the coating as alkali metal, for example lithium or sodium. Thus, the second layer can provide a protective function, while allowing passage of alkali metal ions during charge and discharge. The second layer may have an ionic conductivity of greater than $10^{-9}$ S $cm^{-1}$, preferably greater than $10^{-8}$ S $cm^{-1}$, preferably greater than $10^{-7}$ S $cm^{-1}$, more preferably greater than $10^{-6}$ S $cm^{-1}$, for example greater than $10^{-5}$ S $cm^{-1}$.

The second layer has a low electronic conductivity, i.e. is substantially electronically insulating. The inclusion of a layer with a low electronic conductivity may avoid deposition of alkali metal ions such as $Li^+$ and $Na^+$ on top of the protection layer. The second layer may have an electronic conductivity of less than $10^{-5}$ S $cm^{-1}$, preferably less than $10^{-8}$ S $cm^{-1}$, more preferably less than $10^{-10}$ S $cm^{-1}$. In one example the electronic conductivity is less than $10^{-12}$ S $cm^{-1}$.

The second layer may comprise at least one of a ceramic or glass material, a polymer material, a polymer and ceramic composite material, and combinations thereof. Suitable ceramic or glass materials include, for example, one or more elements selected from lithium, oxygen, phosphorous, nitrogen, sulfur, boron, selenium, fluorine, chlorine, bromine or iodine. Suitable ceramic materials may be stoichiometric or non-stoichiometric. The ceramic material may be an oxynitride, sulphide, phosphate, oxide, oxysulfide, thiophosphate, borate, oxyborate, borohydride, silicate, aluminate or thioaluminate compound, or a combination thereof. Examples of suitable materials include lithium oxynitride, lithium sulphide, lithium phosphate, lithium oxide, lithium oxysulfide, lithium thiophosphate, lithium borate, lithium oxyborate, lithium borohydride, lithium silicate, lithium aluminate and lithium thioaluminate, or combinations thereof. Alternatively, the material may be selected from one or more of sodium oxynitride, sodium sulphide, sodium phosphate, sodium oxide, sodium oxysulfide, sodium thiophosphate, sodium borate, sodium oxyborate, sodium borohydride, sodium silicate, sodium aluminate and sodium thioaluminate. The ceramic material may be an amorphous material.

Examples of suitable ceramic materials include LiPON, LLZO, LATP, LGPS, LPS and LAGP. LiPON, LLZO, LATP, LGPS, LPS and LAGP are examples of materials that are also useful as solid-state conductive electrolytes. Further examples of conductive ceramic or glass materials include $Li_2S$—$P_2S_5$—LiI, $Li_2S$—$SiS_2$—LiI, $Li_2S$—$SiS_2$—$Li_3PO_4$, $Li_2O$—$P_2O_5$—$Li_2SO_4$, $Li_2O$—$B_2O_3$—LiI, $Li_2O$—$Al_2O_3$—$B_2O_3$, $Li_2O$—$Al_2O_3$—$SiO_2$, and $Li_2O$—$SiO_2$—$B_2O_3$.

A particularly preferred ceramic material is a lithium oxynitride, such as a lithium phosphorus oxynitride. LiPON is an example of an amorphous, non-stoichiometric lithium phosphorus oxynitride that has a low electronic conductivity and a high ionic conductivity. Exemplary values of electronic conductivity and ionic conductivity for LiPON are in the region of $10^{-12}$ S $cm^{-1}$ and $10^{-6}$ S $cm^{-1}$ respectively.

The second layer may comprise a conductive polymer material, for example an ionically conductive polymer. Additionally or alternatively, the second layer may comprise a polymer material having an alkali metal salt distributed within the polymer material. This may provide or increase ionic conductivity within the polymer. The second layer may instead or additionally comprise a polymer-ceramic composite material. A polymer-ceramic composite material may comprise ceramic particles that are bound together by at least one polymer material. The polymer or polymers used to form the polymer-ceramic composite material may have inherent alkali metal ion conductivity, or may be mixed with alkali metal salts.

For example, the polymer material may comprise a lithium salt (e.g. LiTFSI) dissolved within a polyethylene oxide phase. Further examples of lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate. Suitable sodium salts include sodium hexafluorophosphate, sodium hexafluoroarsenate, sodium nitrate, sodium perchlorate, sodium trifluoromethanesulfonimide, sodium bis(oxalate) borate and sodium trifluoromethanesulphonate. Combinations of salts may be employed.

The polymer may comprise at least one functional group selected from the list of amine, amide, carbonyl, carboxyl, ether, thioether and hydroxyl groups, and mixtures thereof. Non-limiting examples of polymers include polyanhydrides, polyketones, polyesters, polystryenes, polyamides, polyimides, polyurethanes, polyolefins, polyvinylenes. Non-limiting examples of ionically conductive polymers may include nitrogen or sulfur containing polymers, for example polypyrroles (PPY), polycarbazoles, polyindoles, polyazepines, polyanilines, polythiophenes, PEDOT, PPS. Further examples of ionically conductive polymers may include poly(fluorene)s, polyphenylenes, polypyrenes, polyazulenes, polynaphthalenes, poly(acetylene)s (PAC) and poly (p-phenylene vinylene) (PPV). In one embodiment, the polymer material is polyethylene oxide.

The anode in accordance with the present invention may be used to assemble any suitable cell. The anode may be coupled to any suitable cathode comprising positive electrode material. For example, the anode and a cathode comprising a mixture of electroactive material and solid electroconductive material may be placed in contact with an electrolyte.

The cathode of the electrochemical cell includes a suitable electroactive material. Optionally, the cathode may also comprise a current collector, for example a metal such as aluminium, copper or nickel foil.

Examples of positive electroactive materials suitable for lithium-based cells include composite materials which comprise lithium sulphide, sulphur, lithium oxide, oxygen, lithium cobalt oxide, lithium nickel cobalt manganese oxides, lithium nickel aluminium oxides, lithium nickel cobalt aluminium oxides, lithium nickel manganese oxides, lithium manganese oxides, lithium iron phosphate, lithium manganese phosphate, lithium cobalt phosphate, lithium iron fluoride, and combinations thereof. Examples of positive electroactive materials suitable for sodium-based cells include composite materials which comprise sodium cobalt oxides, sodium vanadium oxides, sodium manganese oxides, sodium nickel cobalt manganese oxides, sodium chromium oxides, sodium iron phosphate, sodium vanadyl fluorophosphates, sodium iron fluorides, and combinations thereof.

In the case of a lithium sulphur cell, the cathode may comprise a mixture of electroactive sulphur material and electroconductive material. This mixture forms an electroactive layer, which may be placed in contact with a current collector. The electroactive material and electroconductive material may form a matrix on the current collector. The electroactive sulphur material may comprise elemental sulphur, sulphur-based organic compounds, sulphur-based inorganic compounds and sulphur-containing polymers. Preferably, elemental sulphur is used. In one embodiment, the cathode comprises a sulphur-carbon composite. The cathode may comprise an electroactive sulphur material that may also be ionically conductive. This material may contain sulphur as well as additional elements such as Li, Na, Mg, P, N, Si, Ge, Ti, Zr, Sn, B, Al, F, Cl, Br, I, O or any combination thereof. Examples of sulphur containing materials that are also ionically conductive include LGPS, $Li_3PS_4$ or $Li_7P_3S_{11}$. In one embodiment, the cathode may comprise a sulphur-carbon composite that is also ionically conductive.

The solid electroconductive material may be any suitable conductive material. Preferably, this solid electroconductive material may be formed of carbon. Examples include carbon black, carbon fibre, graphene and carbon nanotubes. Other suitable materials include metal (e.g. flakes, filings and powders) and conductive polymers. Examples of conductive polymers include polypyrole, polythiophene, polyaniline, polyacetylene, polyphenylene vinylene and poly(3,4-ethylenedioxythiophene). Preferably, carbon black is employed. In one embodiment, where the cathode comprises a sulfur-carbon composite, a further solid electroconductive material may be absent from the cathode.

The cathode may further comprise an ionically conductive material, specifically a solid $Li^+$ or $Na^+$ ionic conductor. The ionically conductive material may have a bulk ionic conductivity of greater than $10^{-7}$ S/cm at 25° C., for example greater than $10^{-6}$ S/cm. Where the cathode contains an electroactive, ionically conductive material such as $Li_3PS_4$ or $Li_xP_yS_z$, a further ionically conductive material may be absent. In some examples, the lithium-ion conductive material comprises a ceramic material. The ceramic material may have a crystalline, polycrystalline, partially crystalline, or amorphous structure. Suitable ceramic materials include, but are not limited to, oxides, carbonates, nitrides, carbides, sulfides, oxysulfides, and/or oxynitrides of metals and/or metalloids. In some cases, the ceramic material comprises lithium or sodium. Non-limiting examples of suitable solid-state electrolytes of sufficient ionic conductivity may be produced by a combination of various lithium compounds, such as ceramic materials including lithium include lithium oxides (e.g., $Li_2O$, $LiO$, $LiO_2$, $LiRO_2$, where R is scandium, yttrium, lanthanum, cerium, praseodymium, neodymium, promethium, samarium, europium, gadolinium, terbium, dysprosium, holmium, erbium, thulium, ytterbium, and/or lutetium), lithium carbonate ($Li_2CO_3$), lithium nitrides (e.g., $Li_3N$), lithium oxysulfide, lithium oxynitride, lithium garnet-type oxides (e.g., $Li_7La_3Zr_2O_{12}$), $Li_{10}GeP_2S_{12}$, lithium phosphorus oxynitride, lithium silicosulfide, lithium germanosulfide, lithium lanthanum oxides, lithium titanium oxides, lithium borosulfide, lithium aluminosulfide, lithium phosphosulfide, lithium silicate, lithium borate, lithium aluminate, lithium phosphate, lithium halides, and combinations of the above. In certain cases, the ceramic material comprises a lithium oxide, a lithium nitride, or a lithium oxysulfide. In some embodiments, the ceramic includes a carbonate and/or a carbide. In a sodium-based cell, the sodium ion equivalent of any of these materials may be used.

In some embodiments, the lithium or sodium ion-conductive material may be selected from species that can donate electron pairs (e.g., a Lewis base). Examples of suitable electron-donating materials include, but are not limited to, lithium oxides (e.g., $Li_2O$, $LiO$, $LiO_2$, $LiRO_2$, where R is scandium, yttrium, lanthanum, cerium, praseodymium, neodymium, promethium, samarium, europium, gadolinium, terbium, dysprosium, holmium, erbium, thulium, ytterbium, and/or lutetium), lithium carbonate ($Li_2CO_3$), lithium nitrides (e.g., $Li_3N$), lithium oxysulfide, lithium oxynitride, lithium garnet-type oxides (e.g., $Li_7La_3Zr_2O_{12}$), $Li_{10}GeP_2S_{12}$, lithium phosphorus oxynitride, lithium silicosulfide, lithium germanosulfide, lithium lanthanum oxides, lithium titanium oxides, lithium borosulfide, lithium aluminosulfide, lithium phosphosulfide, lithium silicate, lithium borate, lithium aluminate, lithium phosphate, lithium halides, and combinations of the above. Sodium equivalents of the above may also be envisaged.

Examples of ceramic materials that can be used as the lithium-ion conductive material include: Li-containing oxides e.g. $Li_{3.3}La_{0.56}TiO_3$; Nasicon structure (eg: LiTi $(PO_4)_3$); LiSICON ($Li_{14}Zn(GeO_4)_4$); $Li_{10}GeP_2S_{12}$; Garnet: $Li_7La_3Zr_2O_{12}$; $Li_2O$; other oxides e.g. Al2O3, TiO2, ZrO2 SiO2, ZnO; sulfides e.g. $Li_2S$—$P_2S_5$; antiperovskites e.g. $Li_3OCl$; hydrides e.g. $LiBH_4$, $LiBH_4$—LiX (X=Cl, Br, I), $LiNH$, $LiNH_2$, $Li_3AlH_6$, $Li_2NH$; borates or phosphates e.g. $Li_2B_4O_7$, $Li_3PO_4$, LiPON; carbonates or hydroxides e.g. $Li_2CO_3$, LiOH; fluorides, e.g. LiF; nitrides e.g. Li3N; sulfides e.g. lithium borosulfides, lithium phosphosulfides, lithium aluminosulfides, oxysulfides, praseodymium oxide. At least one of said ceramic materials may be used, or combinations thereof. In a sodium sulphur cell, the sodium ion equivalent of any of these conductive materials may be utilised.

In some examples, the lithium or sodium ion conductive material may be formed of a polymeric material which is inherently ionically conductive, e.g. Nafion. Alternatively, polymers blended with lithium (or sodium) salts, which can achieve bulk conductivities of greater than $10^{-7}$ S/cm, may also be used. Examples of suitable polymers include EO based polymers (for example PEO); acrylate based polymer (for example PMMA); polyamines (polyethyleneimine); siloxanes (poly(dimethylsiloxane)); polyheteroaromatic compounds (e.g., polybenzimidazole); polyamides (e.g. Nylons), polyimides (e.g. Kapton); polyvinyls (e.g. polyacrylamide, poly(2-vinyl pyridine), poly(N-vinylpyrrolidone), poly(methylcyanoacrylate), poly(vinyl acetate), poly (vinyl alcohol), poly(vinyl chloride), poly(vinyl fluoride); inorganic polymers (e.g. polysilane, polysilazane. polyphosphazene, polyphosphonate); polyurethanes; polyolefins (e.g. polypropylene, polytetrafluoroethylene); polyesters (e.g. polycarbonate, polybutylene terephthalate). In one embodiment, co-block polymers such as Nafion may be used. At least one of said polymeric materials may be used, or combinations thereof. In one embodiment, the cathode contains ceramic particles in combination with one or more ionically conductive polymers.

The electroactive material in the cathode may be present on the current collector in an amount of 60 to 90 weight %, preferably 65 to 85 weight %, more preferably 70 to 80 weight %. The electrically conductive material may be present in the matrix deposited on the current collector in an amount of 10 to 45 weight %, preferably 15 to 35 weight %, more preferably 20 to 25 weight %. The weight ratio of electroactive material to electrically conductive material may be 0.01-10:10-50, preferably 0.1-5:15-45, more preferably 1-5:20-35.

Where a separator is present in the cell, the separator may comprise any suitable porous substrate that allows ions to move between the electrodes of the cell. The separator should be positioned between the electrodes to prevent direct contact between the electrodes. The porosity of the substrate should be at least 30%, preferably at least 50%, for example, above 60%. Suitable separators include a mesh formed of a polymeric material. Suitable polymers include polypropylene, nylon and polyethylene. Non-woven polypropylene is particularly preferred. It is possible for a multi-layered separator to be employed.

Any suitable electrolyte may be included within the electrochemical cell. In one embodiment, the electrolyte is a liquid electrolyte. The electrolyte may comprise an organic solvent and an electrolyte salt. Suitable organic solvents include ethers, esters, amide, amine, sulfoxides, sulfamides, organophosphates, ionic liquids, carbonates and sulfones. Mixtures of one or more solvents may be employed. Examples of solvents include ethylene carbonate, dimethyl carbonate, tetrahydrofuran, 2-methyltetrahydrofuran, methylpropylpropionate, ethylpropylpropionate, methyl acetate, 1,2-dimethoxyethane, 1,3-dioxolane, diglyme (2-methoxyethyl ether), triglyme, tetraglyme, butyrolactone, 1,4-dioxane, 1,3-dioxane, hexamethyl phosphoamide, pyridine, dimethyl sulfoxide, tributyl phosphate, trimethyl phosphate, N, N, N, N-tetraethyl sulfamide, and sulfones and mixtures thereof.

The organic solvent of the electrolyte may have a viscosity of less than 20 cP, preferably less than 10 cP, more preferably less than 7 cP at 25 degrees C. Where mixtures of organic solvents are employed in the electrolyte, the mixtures may have a viscosity of less than 20 cP, preferably less than 10 cP, more preferably less than 7 cP at 25 degrees C. In one embodiment, the electrolyte may have a viscosity of less than 20 cP, preferably less than 10 cP, more preferably less than 7 cP at 25 degrees C.

Suitable electrolyte salts include lithium or sodium salts. Suitable lithium salts include lithium hexafluorophosphate, lithium hexafluoroarsenate, lithium nitrate, lithium perchlorate, lithium trifluoromethanesulfonimide, lithium bis(oxalate) borate and lithium trifluoromethanesulphonate. Suitable sodium salts include sodium hexafluorophosphate, sodium hexafluoroarsenate, sodium nitrate, sodium perchlorate, sodium trifluoromethanesulfonimide, sodium bis(oxalate) borate and sodium trifluoromethanesulphonate. Preferably the lithium salt is lithium trifluoromethanesulphonate (also known as lithium triflate). Combinations of salts may be employed. For example, lithium triflate may be used in combination with lithium nitrate. The lithium salt may be present in the electrolyte at a concentration of 0.1 to 6M, preferably, 0.5 to 3M, for example, 1M.

The electrolyte may also comprise lithium or sodium polysulphides. For example, lithium polysulphides may be added to the electrolyte before the cell is discharged. The concentration of lithium polysulphide dissolved in the electrolyte may be between 0.1% and 20% weight % (preferred concentration 1.5%). Examples of suitable lithium polysulphides include $Li_2S_n$ where n=at least 5, for example, 6 to 15, for example, 8-12 (e.g. 8) Lithium or sodium polysulphides may help to buffer the electrolyte, increase capacity of the cell or act as a source of sulphur to compensate for any loss of sulphur through the formation of non-conducting species.

A cell in accordance with the present invention may be provided in a suitable housing. This housing can define the electrochemical zone. Preferably, the housing is flexible, for example a flexible pouch. The pouch may be formed of a composite material, for example a metal and polymer composite. In one embodiment, one or more cells is enclosed in the housing. The cell or cells may be sealed in the pouch. A region of each of the cell or cells may protrude from the housing. This region may be coupled to a contact tab formed of, for example, nickel. The contact tab may be connected to the alkali metal or alkali metal alloy by any suitable method, for example by (ultrasonic) welding. Alternatively, the contact tab itself may protrude from the housing. Where a plurality of electrochemical cells are present in the cell assembly, a region of each of the anodes may be pressed or coupled together to form a pile of anodes that may be connected to a contact tab.

A cell in accordance with the present invention may be subjected to a force. Preferably, the force is an anisotropic force i.e. has a different value when measured in different directions. A component of the force is applied, for example is normal to, an active surface of the anode of the electrochemical cell. In one embodiment, the force is applied continuously to the cell. In one embodiment, the force is maintained at a particular value. Alternatively, the force may vary over time. The force may be applied across the entire surface of the anode. Alternatively, the force may be applied over a portion of the surface of the anode, such as over at least 80% of the surface, preferably over at least 60%, preferably over at least 40% of the surface, for example over at least 20% of the surface. The force may be applied directly to the cell. Alternatively, the force may be applied to one or more plates, for example metal plates, that are situated outside of the cell or stack of cells. The force may be applied externally to the housing in which one or more cells is contained. For example, one or more cells may be contained within a flexible pouch, and a force may be applied externally to the flexible pouch.

The force may enhance the performance of an electrochemical cell. Without wishing to be bound by any theory, it is believed that the pressure applied to the anode enables intimate contact to be maintained between the protection layer and the alkali metal or metal alloy layer. The application of pressure to the anode may enable formation of alkali metal plating below the protection layer, between the protection layer and the alkali metal/metal alloy. This may avoid or reduce the formation of plating on top of the protection layer, which may be inhomogeneous and may result in cracking or pitting on the surface. Where plating occurs under the protection layer, the smooth surface of the anode may be preserved, and the formation of cracks or voids on the surface may be reduced. Dendrite formation may then be prevented. Furthermore, alkali metal depositions located under the protection layer are not in direct contact with the electrolyte. This may prevent the electrolyte from being reduced during cycling, which may avoid a reduction in cycle life of a cell.

In one embodiment, the force may be a clamping force. Alternatively, the force may be a compression force. The clamping force may be applied to the cell using a clamp. Alternatively, one or more constricting elements may be positioned around the exterior of the cell or cells. The constricting element may take the form of a band or tubing that surrounds at least part of the exterior of the cell or cells. The band may be made of any suitable material. In one embodiment, the band is formed of an elastic material that may be stretched around the cell or cells and, when in position, applies a constricting force. In one embodiment, the band is an elastic band. Alternatively, the band may be tightened around the cell or cells. The constricting element may also take the form of a shrink wrap material. In a further arrangement, one or more compression springs may be used, for example the cell or cells may be contained within a containment structure in which one or more compression springs are located between the containment structure and the cell. Other means of applying force can include screws or weights.

One or more of the above methods of applying a force may be employed. Any suitable force of greater than 0 MPa may be used. The force applied to the cell or cells may be within the range of up to 0.5 MPa, preferably up to 2 MPa, for example up to 5 MPa. The force may be at least 0.1 MPa, preferably at least 0.5 MPa, for example at least 1 MPa. The force may be between 0.1 MPa and 5 MPa, preferably between 0.5 MPa and 3 MPa, for example between 1 MPa and 1.5 MPa.

Also disclosed herein is a method for forming an electrochemical cell comprising a protection layer as described above. In particular, the protection layer may comprise a metal and/or non-metal that alloys with an alkali metal and is formed on a current collecting layer, and a second layer deposited on the first layer and comprises an ionically conducting layer having an electronic conductivity of less than $10^{-5}$ S cm$^{-1}$. In accordance with one aspect of the present invention, there is disclosed a method of forming an electrochemical cell assembly comprising one or more cells as described above. In accordance with the present invention, the method comprises providing a current collecting layer, contacting at least one metal and/or non-metal that forms an alloy with an alkali metal with the current collector to form a first layer, and depositing an ionically conducting layer having an electronic conductivity of less than $10^{-5}$ S cm$^{-1}$ on the surface of the first layer to form a second layer. Preferably, at least one of the first and second layers is a continuous layer, and more preferably both the first and second layers are continuous.

Any suitable method may be used to form the first layer. Examples of suitable methods include physical or chemical deposition methods, such as physical or chemical vapour deposition. Suitable methods may include plasma-enhanced chemical vapour deposition, sputtering, evaporation, electron-beam evaporation, and chemical vapor deposition (CVD). These methods may be used, for example, to deposit a first layer on the current collecting layer. Additionally or alternatively, these methods may be used to deposit the second layer of the protection layer onto the first layer. Alternative methods of forming the first and/or second layers may include ink-jet printing, slot die and spray coating. These methods may be used for the application of, for example, a second layer comprising a polymer.

The following examples are only intended to illustrate the invention. They shall not limit the scope of the claims in any way.

EXAMPLES

Example 1

Alloy Protection Layer

Figures 2, 2A, 2B, 2C:
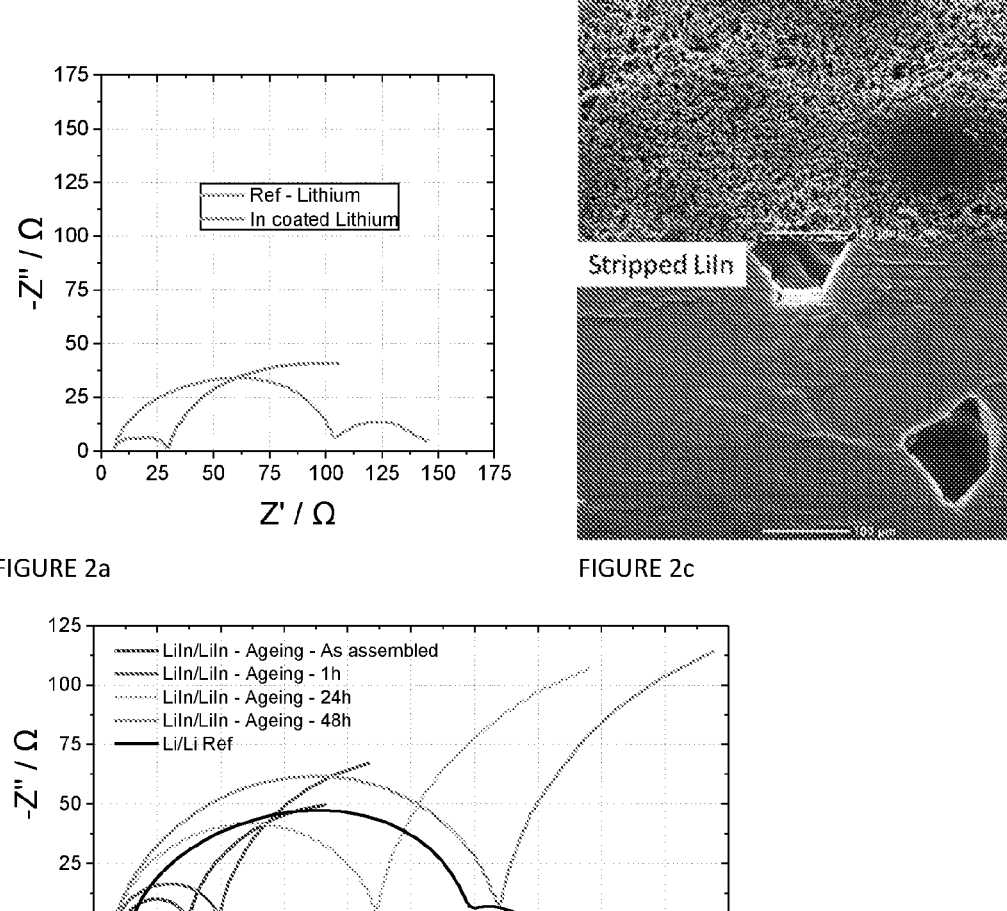
FIG. 2 provides SEM images and impedance graphs of a lithium anode having an alloy layer formed on the surface.

An alloy protection layer was formed on a lithium foil anode. The alloy protection layer is formed by depositing an indium thin film by sputtering. FIG. 2a illustrates impedance of a reference anode comprising lithium, and an anode comprising lithium and an indium coating. As seen in FIG. 2a, impedance characteristics of the assembled anode having an indium coating are improved in contrast to the reference anode. However, over time, the indium layer reacts with the electrolyte resulting in increased resistance, as seen in FIG. 2b. FIG. 2c shows significant plating on top of the indium layer, and uneven lithium stripping. Formation of voids on the surface of the anode is observed.

Example 2

Ceramic Protection Layer

A ceramic protection layer comprising LiPON was formed on the surface of a lithium electrode. FIG. 3a indicates a large charge transfer resistance when the ceramic layer is applied. The charge transfer resistance remained stable over time. However, very inhomogeneous lithium stripping and plating was observed (FIG. 3b).

Example 3

Combination of Alloying Layer and LiPON Layer

Figure 4:
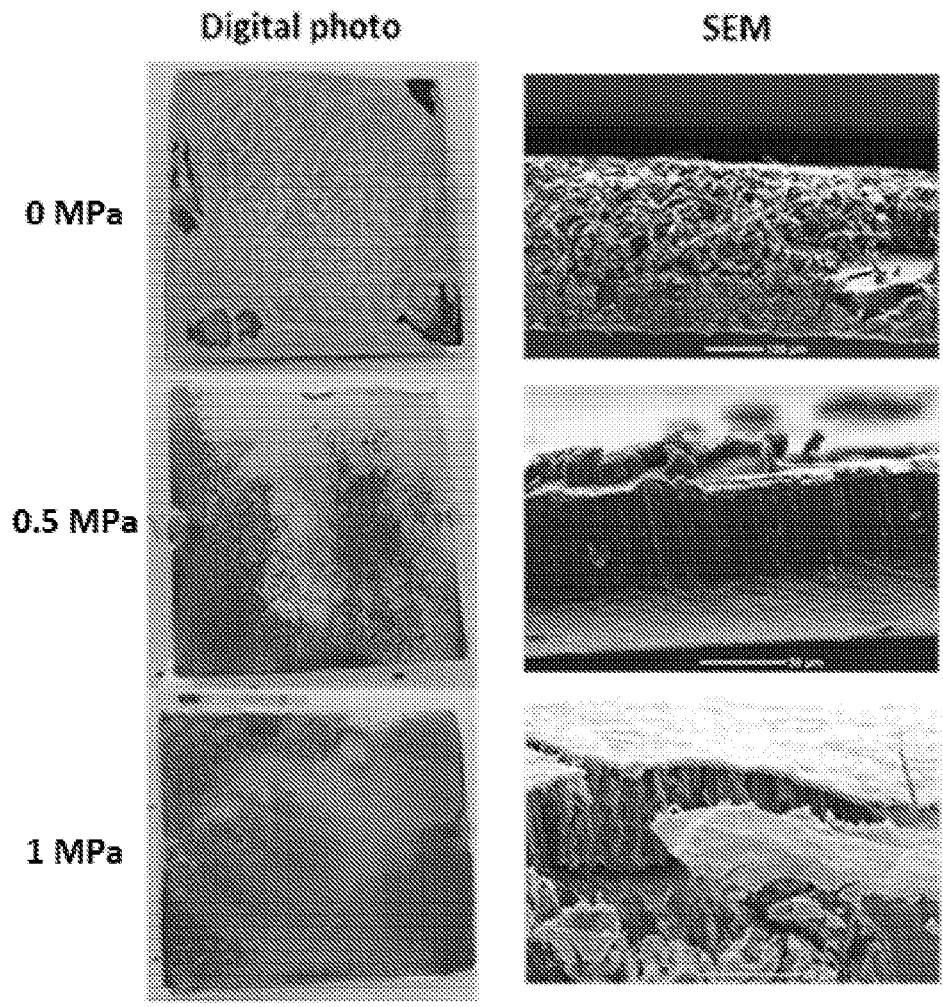
FIG. 4 provides digital photographs and SEM images of a protected lithium anode after completion of a lithium plating step under application of a force of 0 MPa, 0.5 MPa and 1 MPa in accordance with an embodiment of the invention.

Force was applied to lithium anodes having a protective layer first comprising a layer of indium on the lithium anode, followed by a LiPON layer on the indium layer. Force was applied by means of a clamp. Following a single cycle (which involves charge and then discharge of the cell, in which stripping followed by plating occurs), digital photographs and SEM images (FIG. 4) show the extent of lithium plating on top and below the protection layer. Where no force is applied to the lithium anode, lithium is shown to plate both on top and below the protection layer. In particular, lithium plating on top of the protection layer is seen. At 0.5 MPa, lithium plating on top and below the protection layer is seen. In comparison to 0 MPa, less lithium plating on top of the protection layer is evident. On application of a greater force of 1 MPa, lithium is seen to mostly plate below the protection layer, with only a very small area of lithium plating on top of the protection layer. In the lithium plating step, 4 mA h cm$^{-1}$ was plated. This is approximately equivalent to the formation of a 20 μm thick layer of lithium under the protection layer, at 1 MPa.

Figure 5:
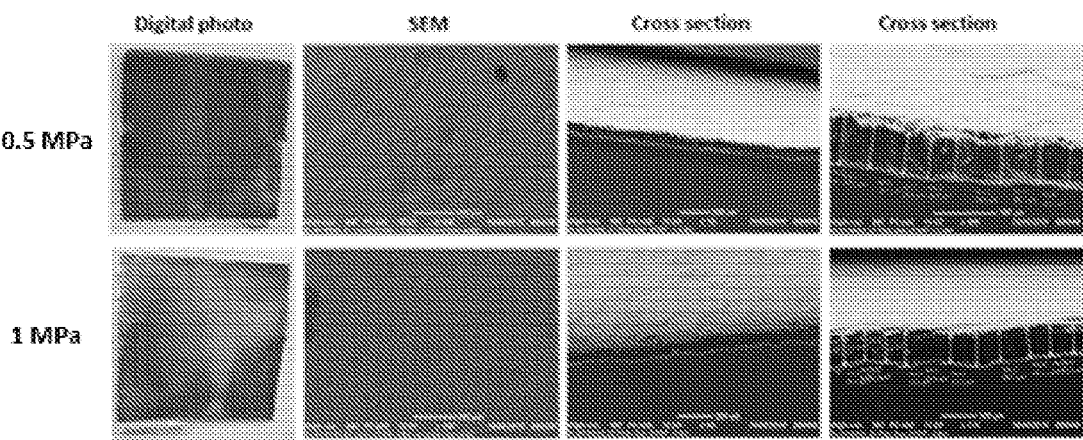
FIG. 5 provides digital photographs, SEM images and cross sections of a protected lithium anode following a lithium stripping step in accordance with an embodiment of the invention.

FIG. 5 illustrates a protected lithium anode having a protective layer first comprising a layer of indium on the lithium anode followed by a LiPON layer on the indium layer, after a cycle in which lithium plating was followed by stripping with application of a force of 0.5 MPa and 1 MPa. The surface of the protected lithium appears to be pristine and smooth. No significant defects or voids are evident, and any cracks or variations in thickness can be attributed to sample processing, rather than inhomogeneous lithium plating. The stripped electrodes show homogeneous stripping of the electrode without substantial pitting and/or cracking. FIG. 6 illustrates impedance characteristics of said protected lithium anode, compared to a bare lithium anode and a lithium anode having a LiPON layer only. A reduction in impedance is evident for the protected lithium anode.

Example 4

Pouch Cell Comprising Protected Lithium Anode

Figure 7:
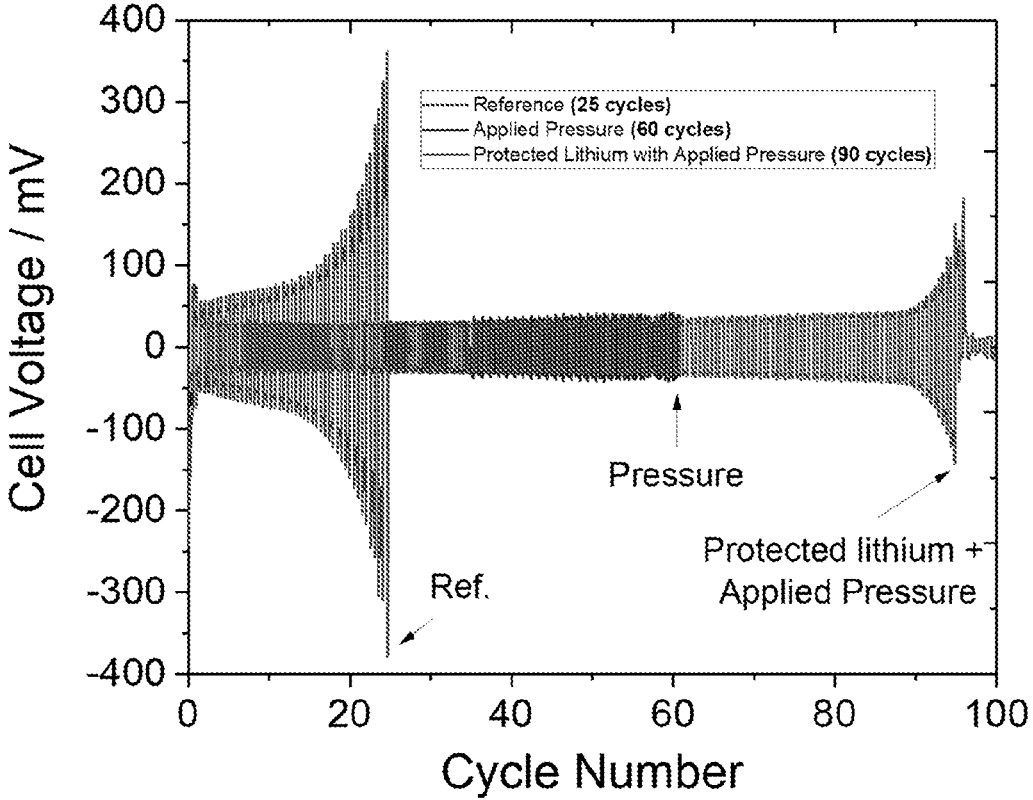
FIG. 7 provides electrochemical data for a protected lithium anode in accordance with an embodiment of the present invention.

A lithium pouch cell was constructed comprising a protected lithium anode having a protective layer first comprising a layer of indium on the lithium anode followed by a LiPON layer on the indium layer. The pouch cell was a symmetric pouch cell containing two protected lithium electrodes (one acting as a working electrode and the other acting as a counter/reference electrode. Each protected lithium electrode had an active face of 33.6 cm$^2$ in area. FIG. 7 provides electrochemical data for said pouch cell over a number of cycles, wherein the cell was charged/discharged at 0.4 mA cm$^{-2}$ with 4 mA h cm$^{-2}$ of charge passed per step. The pouch cell was subjected to pressure of 1 MPa during cycling. FIG. 7 also provides electrochemical data for a comparative cell in which a bare lithium foil anode was used, and a further comparative cell in which a bare lithium foil anode was used and no pressure was applied to the cell. Improved cycling is seen for the lithium pouch cell comprising the protected anode. Cycling of the cells comprising bare lithium foil anodes was stopped at 25 cycles (reference cell) and 60 cycles (applied pressure) respectively as shorting was observed.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The invention claimed is:

1. An electrochemical cell assembly comprising:

at least one electrochemical cell or cells comprising a cathode comprising an electrochemically active material;

an anode comprising an alkali metal or alkali metal alloy layer and a protection layer containing a first layer and a second layer; wherein the first layer comprises a metal and/or non-metal that alloys with an alkali metal and is formed on the alkali metal or alkali metal alloy layer, and the second layer deposited on the first layer, wherein the second layer is an ionically conducting layer having an electronic conductivity of less than $10^{-5}$ S cm$^{-1}$; and an electrolyte, and wherein the cell assembly is further configured to apply a force comprising at least 0.5 MPa of pressure continuously to at least 80% of a surface of the anode; and wherein the first layer has a thickness of 1 nm to 5000 nm.

2. The electrochemical cell assembly as claimed in claim 1, wherein the alkali metal or alkali metal alloy comprises a lithium metal or metal alloy or a sodium metal or metal alloy.

3. The electrochemical cell assembly as claimed in claim 1, wherein the anode further comprises a current collector.

4. The electrochemical cell assembly as claimed in claim 1, wherein the first layer comprises at least one metal or non-metal selected from aluminium, boron, zinc, gallium, indium, carbon, silicon, germanium, tin, lead, antimony, silver, gold, sodium, potassium, magnesium, calcium, and mixtures thereof, preferably indium or zinc.

5. The electrochemical cell assembly as claimed in claim 1, wherein the first layer has an electronic conductivity of more than $10^{-5}$ S cm$^{-1}$.

6. The electrochemical cell assembly as claimed in claim 1, wherein the first layer has a lithium diffusivity, during cycling, of more than $10^{-15}$ cm$^2$ s$^{-1}$.

7. The electrochemical cell assembly as claimed in claim 1, wherein the first layer has an ionic conductivity of greater than $10^{-9}$ S cm$^{-1}$.

8. The electrochemical cell assembly as claimed in claim 1, wherein the second layer comprises at least one of a ceramic material, a polymer material, a polymer and ceramic composite material, and combinations thereof.

9. The electrochemical cell assembly as claimed in claim 1, wherein the second layer comprises an oxynitride, sulphide, phosphate, oxide, oxysulfide, thiophosphate, borate, oxyborate, borohydride, silicate, aluminate, or thioaluminate compound, or a combination thereof.

10. The electrochemical cell assembly as claimed in claim 9, wherein the ceramic material is LiPON.

11. The electrochemical cell assembly as claimed in claim 8, wherein the polymer material is polyethylene oxide.

12. The electrochemical cell assembly as claimed in claim 1, wherein the second layer has an ionic conductivity of greater than $10^{-9}$ S cm$^{-1}$.

13. The electrochemical cell assembly as claimed in claim 1 wherein the second layer has a thickness of between 1 nm and 1000 nm.

14. The electrochemical cell assembly as claimed in claim 1 wherein a total amount of alkali metal able to be stored within the first layer is less than 10% of a electrochemical alkali metal storage capacity of the electroactive material within the cathode.

15. The electrochemical cell assembly as claimed in claim 1 wherein the pressure is applied using a band, wrap or tubing positioned on the outside of the cell.

16. The electrochemical cell assembly as claimed in claim 1 wherein the cell or cells are selected from a lithium sulphur cell or a sodium sulphur cell, a lithium air cell or a sodium air cell, or a lithium ion cell or a sodium ion cell.

17. The electrochemical cell assembly as claimed in claim 3, wherein the current collector is a copper or nickel current collector.

18. A method of forming an electrochemical cell assembly in accordance with claim 1, said method comprising the steps of:

a) providing an alkali metal or alkali metal alloy layer;

b) contacting at least one metal and/or non-metal that forms an alloy with an alkali metal with the alkali metal or alkali metal alloy layer to form a continuous first layer, wherein the first layer has a thickness of between 1 nm and 5000 nm;

c) depositing an ionically conducting layer having an electronic conductivity of less than $10^{-5}$ S cm$^{-1}$ on the surface of the first layer to form a continuous second layer; wherein steps a) to c) form an anode;

d) providing an electrolyte;

e) providing a cathode; wherein steps a) to e) form an electrochemical cell, f) applying continuous pressure to at least 80% of a surface of the anode of the at least one cell formed in accordance with steps a) to e), wherein the pressure applied is at least 0.5 MPa.

19. The method as claimed in claim 18, wherein at least one of the first and second layers is formed by physical vapour deposition.

\* \* \* \* \*